United States Patent
Gao et al.

(10) Patent No.: US 10,411,987 B2
(45) Date of Patent: Sep. 10, 2019

(54) SIGNALING MONITORING METHOD AND SYSTEM

(71) Applicant: ZTE Corporation, Shenzhen (CN)

(72) Inventors: Zhisen Gao, Shenzhen (CN); Ping Liang, Shenzhen (CN); Bin Xu, Shenzhen (CN); Xunniu Zhang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 73 days.

(21) Appl. No.: 15/529,387

(22) PCT Filed: Jan. 29, 2015

(86) PCT No.: PCT/CN2015/071867
§ 371 (c)(1),
(2) Date: May 24, 2017

(87) PCT Pub. No.: WO2016/082328
PCT Pub. Date: Jun. 2, 2016

(65) Prior Publication Data
US 2017/0272350 A1  Sep. 21, 2017

(30) Foreign Application Priority Data
Nov. 24, 2014 (CN) .......................... 2014 1 0683095

(51) Int. Cl.
*H04L 12/26* (2006.01)
*H04L 12/707* (2013.01)
(Continued)

(52) U.S. Cl.
CPC ............ *H04L 43/18* (2013.01); *H04L 43/062* (2013.01); *H04L 43/12* (2013.01); *H04L 45/24* (2013.01);
(Continued)

(58) Field of Classification Search
CPC ....... H04L 43/18; H04L 43/062; H04L 43/12; H04L 45/24; H04L 43/026; H04L 43/028;
(Continued)

(56) References Cited

U.S. PATENT DOCUMENTS

2012/0039472 A1* 2/2012 Liu .................. H04W 12/04
380/270
2012/0157088 A1  6/2012 Gerber et al.
(Continued)

FOREIGN PATENT DOCUMENTS

CN        202737866 U  *  2/2013
CN        103067934 A      4/2013
(Continued)

OTHER PUBLICATIONS

International Search Report dated Sep. 2, 2015 re: Application No. PCT/CN2015/071867; pp. 1-2; citing: CN 104038934 A, CN 103067934 A and WO 2013152592 A1.
(Continued)

*Primary Examiner* — Mark H Rinehart
*Assistant Examiner* — Kokou R Detse
(74) *Attorney, Agent, or Firm* — Cantor Colburn LLP (57) ABSTRACT

Provided are a signaling monitoring method and system. In the method, multi-path network signalings are accessed, and one or multiple key control signalings are acquired from the acquired multi-path network signalings; the one or multiple key control signalings are analyzed to acquire and share whole-network key control information; and the multi-path network signalings are managed and distributed by utilizing the acquired whole-network key control information. Since each access point has an identical whole-network control table consisting of the whole-network key control information, the technical solution can distribute user plane signalings and control plane signalings per a user to each data (Continued)

analysis center according to the whole-network control table, thus ensuring the control plane and user plane signalings related to the user to be distributed to the same data analysis center.

19 Claims, 7 Drawing Sheets

(51) Int. Cl.
    *H04W 12/04*     (2009.01)
    *H04W 24/08*     (2009.01)
    *H04W 88/08*     (2009.01)
    *H04W 88/12*     (2009.01)

(52) U.S. Cl.
    CPC ........... *H04W 12/04* (2013.01); *H04W 24/08* (2013.01); *H04L 43/026* (2013.01); *H04L 43/028* (2013.01); *H04W 88/08* (2013.01); *H04W 88/12* (2013.01)

(58) Field of Classification Search
    CPC ..... H04W 12/04; H04W 24/08; H04W 88/08; H04W 88/12
    USPC ........................................................ 370/329
    See application file for complete search history.

(56) References Cited

U.S. PATENT DOCUMENTS

2013/0217382 A1*   8/2013   Kudo .................... H04W 24/04
                                                                            455/423
2014/0171089 A1     6/2014   Janakiraman et al.

FOREIGN PATENT DOCUMENTS

| CN | 104038934 A | * | 9/2014 |
| CN | 104038934 A | | 9/2014 |
| WO | 2013152592 A1 | | 10/2013 |

OTHER PUBLICATIONS

Supplemental EP Search Report dated Nov. 24, 2017 re: Application No. PCT/CN2015/071867, pp. 1-12, citing: US 2014/171089 A1 and US 2012/157088 A1.

\* cited by examiner

SIGNALING MONITORING METHOD AND SYSTEM

TECHNICAL FIELD

The present disclosure relates to technologies of a large-volume data network, and more particularly to a signaling monitoring method and system.

BACKGROUND

With the rapid development of network technologies and the improvement of technologies, people's life enters a high-speed communication era. 2G, 3G and 4G networks are widely deployed, thus not only facilitating communications between people, but also improving data traffics borne by the 2G, 3G and 4G networks exponentially. A communication network enters an era of large-volume data network. A signaling monitoring system in the related signaling monitoring technology encounters the problems of a difficulty in access, a single-point device performance handling bottleneck, a difficulty in multi-point processing interface association analysis and the like for huge signaling traffics in the network.

Figure 1:
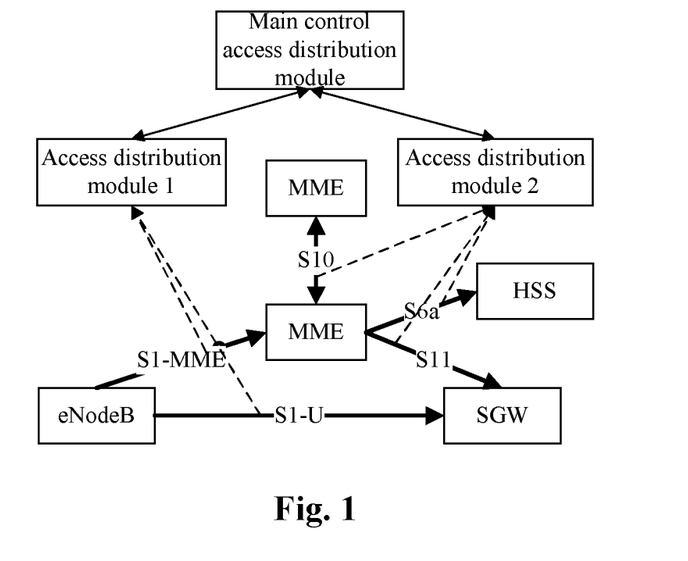
FIG. 1 is a composition structure diagram of a signaling monitoring system of a LTE network.

FIG. 1 is a composition structure diagram of a signaling monitoring system of a Long Term Evolution (LTE) network. As shown in FIG. 1, an operator needs to monitor an S1-Mobility Management Entity (MME) interface of the LTE network. Since an S1-MME interface signaling is encrypted, it is impossible for the signaling monitoring system to decrypt the interface signaling if the signaling monitoring system only collects the S1-MME interface. In order to decrypt the S1-MME interface signaling, interfaces such as S10, S11 and S6a need to be further collected simultaneously. That is to say, multi-interface flow association analysis needs to be carried out to realize decryption of the S1-MME interface signaling of a user. The traffic of each interface of the LTE network is large, multiple interfaces need to be collected in a whole network, and the interfaces also need to be associated. Therefore, the signaling monitoring system cannot be applied, practically.

Figure 2:
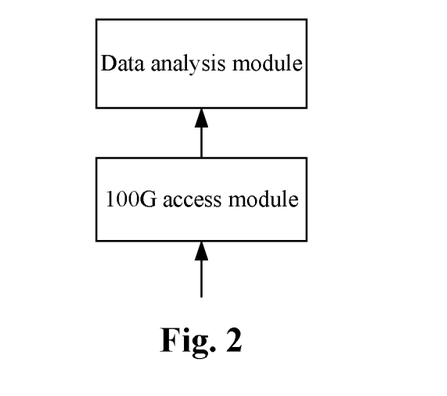
FIG. 2 is an architecture diagram of a single-point large-traffic interface access solution.

To solve the abovementioned problem, a technical solution as shown in FIG. 2 is provided. FIG. 2 is an architecture diagram of a single-point large-traffic interface access solution. The single-point large-traffic interface access solution substantially includes: performing single-point traffic access by using a data interface supporting a large traffic, and performing analysis by using a high-performance calculation device. For example, network traffic is accessed by using a single-point interface supporting 100G data, and calculation and analysis are performed. The advantage of the solution lies in that single-point large-traffic access can be achieved. However, the single-point large-traffic interface access solution has very high requirement on an interface exchange buffer mechanism, thus resulting in high cost and high investment of the interface module. In addition, only simple logic distribution, e.g., distribution based on an Internet Protocol (IP) or a port, can be performed on an interface, while distribution based on upper-layer protocol cannot be performed, thus resulting in that the distributed data is complicated and multi-analysis module concurrent processing cannot be effectively performed. Moreover, more importantly, a single-point bottleneck may be caused, and the performance cannot satisfy large-traffic code stream processing requirements. The evolution of the single-point large-traffic interface access solution is the adoption of multiple data analysis modules, but the same problem still exists.

Figure 3:
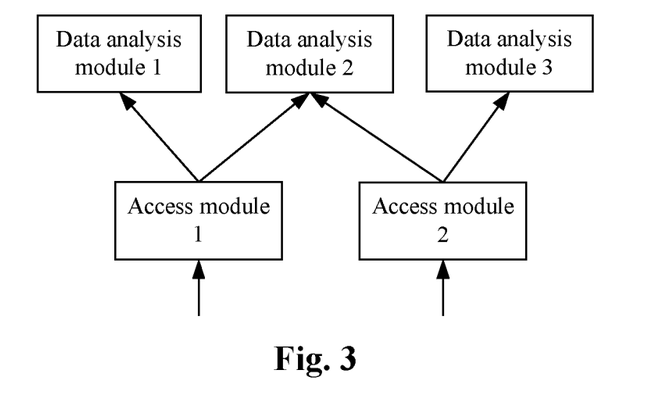
FIG. 3 is an architecture diagram of a multi-point distributed access solution.

Another technical solution is as shown in FIG. 3. FIG. 3 is an architecture diagram of a multi-point distributed access solution. According to the multi-point distributed access solution, access analysis is performed on different interface data independently by using multiple access modules; and network signalings are independently distributed to multiple subsequent analysis modules for processing, so as to realize certain signaling distribution and distributed processing. The advantages of the multi-point distributed access solution lie in that multi-point accesses can be adopted, and the requirements on a single access module is not high, thereby greatly reducing the cost. However, multi-point accesses in the multi-point distributed access solution are independent. The multiple points do not contact with each other, cannot share information, and cannot meet the requirement of association. The multi-point distributed access solution cannot support a scenario of whole-network multi-interface association analysis, such as a scenario of multi-interface association analysis in LTE.

SUMMARY

To solve the abovementioned technical problems, some embodiments of the present disclosure provide a signaling monitoring method and system, which may be able to perform association analysis on whole-network multi-interface traffics, and are suitable for an application scenario of whole-network multi-interface association analysis.

An embodiment of the present disclosure provides a signaling monitoring method, which may include the following acts. Multi-path network signalings are accessed by one or multiple access points, and one or multiple key control signalings are acquired from the acquired multi-path network signalings. The one or multiple key control signalings are analyzed to acquire and share whole-network key control information. The multi-path network signalings are managed and distributed by utilizing the acquired whole-network key control information.

The one access point may be a main control access point.

The multiple access points may be two or more access points, where one of the two or more access points may be a main control access point, and the other access point or points in the two or more access points may be common access point or points.

The act of accessing the multi-path network signalings and acquiring the one or multiple key control signalings from the acquired multi-path network signalings may include the following acts. The common access point or points accesses multi-path network signalings and acquires one or multiple key control signalings from the acquired multi-path network signalings. The common access point or points sends the acquired one or multiple key control signalings to the main control access point.

The act of analyzing the one or multiple key control signalings to acquire and share the whole-network key control information may include the following acts. The main control access point analyzes the one or multiple key control signalings from all the common access point or points to acquire the whole-network key control information and to share the whole-network key control information to all the common access point or points.

The act of managing and distributing the multi-path network signalings by utilizing the acquired whole-network key control information may include the following acts. The common access point or points manages and distributes the multi-path network signalings by utilizing the acquired whole-network key control information.

The multiple access points may be two or more access points, where one of the two or more access points may be a main control access point, and the other access point or points in the two or more access points may be common access point or points.

The act of accessing the multi-path network signalings and acquiring the one or multiple key control signalings from the acquired multi-path network signalings may include the following acts. The main control access point and the common access point or points access multi-path network signalings respectively and acquire the one or multiple key control signalings from the acquired multi-path network signalings. The common access point or points sends the acquired one or multiple key control signalings to the main control access point.

The act of analyzing the one or multiple key control signalings to acquire and share whole-network key control information may include the following acts. The main control access point analyzes the one or multiple key control signalings from all the common access point or points and the one or multiple key control information acquired by the main control access point itself to acquire the whole-network key control information and to share the whole-network key control information to all the common access point or points.

The act of managing and distributing the multi-path network signalings by utilizing the acquired whole-network key control information may include the following acts. The main control access point and the common access point or points manage and distribute the multi-path network signalings by utilizing the acquired whole-network key control information.

The act of acquiring the one or multiple key control signalings from the acquired multi-path network signalings may include the following acts. The network signalings containing the pre-set matching information are determined as control plane signalings according to pre-set matching information, and then key control information is acquired from the determined control plane signalings.

The act of acquiring whole-network key control information may include the following acts. The one or multiple key control signalings are parsed, and key information of various protocols is acquired. Whole-network multi-interface flow association is performed on the key information of various protocols according to an interface flow and a user operation flow, so as to acquire complete whole-network key control information which is embodied as a whole-network control table.

The act of sharing whole-network key control information may include the following act. The main control access point synchronizes key control information to the common access point or points of a whole network.

There may be two or more main control access points. After each main control access point analyzes one or multiple key control signalings managed by the main control access point to acquire key control information, the method may further include the following act. Each main control access point interacts with other main control access point or points about the key control information, such that the key control information in all of the two or more main control access points is updated to whole-network key control information.

The main control access point and the common access point or points may distribute different users to multiple data analysis centers according to traffics and user equilibriums.

After receiving network signaling, the multiple data analysis centers may parse each protocol in the network signalings to acquire multi-interface signaling data, and perform interface flow analysis and multi-interface association analysis on the whole network to generate a protocol analysis data record.

When a user or channel is aged locally, the method may further include the following acts. A local common access point sends a local aging notification to the main control access point. After collecting aging notification information of each common access point, the main control access point deletes the user or channel information, and sends an aging deletion notification to each common access point.

When a common access point is restarted due to failure, the method may further include the following acts. After the common access point is started, a registration notification is sent to the main control access point. When the main control access point judges that the access point is restarted, whole-network control information is synchronized to the common access point.

Another embodiment of the present disclosure provides a signaling monitoring system, which may include at least one main control access point, one or multiple common access points, and one or multiple data analysis centers. The one or multiple common access points are arranged to access multi-path network signalings, acquire one or multiple key control signalings from the acquired multi-path network signalings, output the acquired one or multiple key control signalings to the at least one main control access point, receive and store whole-network key control information from the at least one main control access point, and distribute user plane signalings to the one or multiple data analysis centers according to the whole-network key control information. The at least one main control access point is arranged to analyze the one or multiple key control signalings from each common access point to acquire the whole-network key control information, share the whole-network key control information to each common access point, and distribute control plane signalings to the one or multiple data analysis centers according to the whole-network key control information. The one or multiple data analysis centers are arranged to receive the user plane signalings from the one or multiple common access points and the control plane signalings from the at least one main control access point, perform protocol analysis on each interface of a network to realize multi-interface association, and generate a protocol analysis data record.

The at least one main control access point may be further arranged to: access multi-path network signalings and acquire one or multiple key control signalings from the acquired multi-path network signalings. There may be two or more main control access points, and after each main control access point analyzes one or multiple key control signalings managed by the main control access point to acquire key control information, each main control access point may be further arranged to: interact with other main control access point or points about the key control information, such that the key control information in all of the two or more main control access points is updated to whole-network key control information.

The main control access point and the one or multiple common access points may be further arranged to distribute different users to multiple data analysis centers according to traffics and user equilibriums.

The one or multiple data analysis centers may be further arranged to: parse each protocol in the network signalings to acquire multi-interface signaling data, and perform interface flow analysis and multi-interface association analysis on a whole network to generate a protocol analysis data record.

When a user or channel is aged locally, the local common access point may be further arranged to send a local aging notification to the at least one main control access point. The at least one main control access point may be further arranged to collect aging notification information of each common access point, delete the user or channel information, and send an aging deletion notification to each common access point.

When a common access point is restarted due to failure, the common access point restarted due to failure may be further arranged to: send a registration notification to the at least one main control access point after being started; and the at least one main control access point may be further arranged to judge that the access point is restarted, and synchronize whole-network control information to the common access point.

Still another embodiment of the present disclosure also provides a signaling monitoring system, which may include at least one main control access point, and one or multiple data analysis centers. The at least one main control access point is arranged to access multi-path network signalings, acquire one or multiple key control signalings from the acquired multi-path network signalings, analyze the acquired one or multiple key control signalings to acquire whole-network key control information, and distribute control plane signalings and user plane signalings to the one or multiple data analysis centers according to the whole-network key control information. The one or multiple data analysis centers are arranged to receive the user plane signalings and the control plane signalings from the at least one main control access point, perform protocol analysis on each interface of a network to realize multi-interface association, and generate a protocol analysis data record.

Compared with a related technology, the technical solution of the embodiments of the present disclosure includes: accessing multi-path network signalings, and acquiring one or multiple key control signalings from the acquired multi-path network signalings; analyzing the one or multiple key control signalings to acquire and share whole-network key control information; and managing and distributing the multi-path network signalings by utilizing the acquired whole-network key control information. Since each access point has an identical whole-network control table consisting of the whole-network key control information, the embodiments of the present disclosure distribute user plane signalings and control plane signalings per a user to each data analysis center according to the whole-network control table, thus ensuring the control plane and user plane signalings related to the user to be distributed to the same data analysis center. Compared with a signaling monitoring system, in the technical solution provided by the embodiments of the present disclosure, a large amount of signalings are simultaneously accessed at multiple points, thus realizing association analysis of multi-point access signalings at multiple interfaces, solving the problems of a single-point performance bottleneck existed in a previous system and an impossibility of association of multi-point access. The technical solution provided by the embodiments of the present disclosure is suitable for an application scenario of whole-network multi-interface association analysis.

Other features and advantages of the present disclosure will be elaborated in the following description, and are partially obvious from the description, or understood by implementing the present disclosure. The purposes and other advantages of the present disclosure may be achieved and acquired through the structures specified in the description, the claims and the drawings.

BRIEF DESCRIPTION OF THE DRAWINGS

The drawings described herein are adopted to provide further understanding of the present disclosure, and form a part of the present application. The schematic embodiments and description of the present disclosure are adopted to explain the present disclosure, and do not form limits to the present disclosure. In the drawings.

DETAILED DESCRIPTION OF THE EMBODIMENTS

In order to make the aims, technical solutions and advantages of the present disclosure clearer, the embodiments of the present disclosure will be elaborated below in conjunction with the drawings. It may be appreciated that the embodiments in the present application and the features in the embodiments can be combined under the condition of no conflicts.

After carefully analyzing a network large-traffic data structure, data features and a basic mechanism of a communication network adopted in the related technology, the inventor discovers that: large-traffic data of the communication network may be divided into control plane signalings and user plane signalings according to functions. The control plane signaling is a signaling responsible for user attachment, network access and service acquisition and is a signaling between operator communication network devices. The control plane signaling is used for negotiating a data channel, link and quality for various businesses and services of a user. The ratio of the control plane signalings to the total traffic is smaller than 5-10%. The user plane signaling is specific service data of the user and is a signaling for providing services by a provider such as internet web page browsing data and network video data. The user plane signaling is transmitted in a channel negotiated by the control plane signaling. The ratio of the user plane signalings to the total traffic is greater than 90-95%. That is, the user plane signaling is main data of a large traffic.

The basic mechanism of the communication network is that: the control plane signalings between communication devices are adopted to negotiate an interactive channel of the control plane signalings of a logic object (e.g., user) through request and response flow signalings. For example, for a Gn port between an SGSN and a GGSN, a control plane GTP signaling may be adopted to establish a GTP control channel for a user, including a channel ID (i.e., C-BID) and an identifier of a channel F-TEID (i.e., IP and TEID of GTP). Thus, the user control signaling is transferred from the GTP control channel subsequently. Furthermore, control signalings may be adopted to negotiate an interactive channel of the user plane signalings of the logic object. For example, the GTP signaling is adopted to negotiate multiple user plane GTP channels, including a channel ID (i.e., U-BID) and an identifier of a channel F-TEID (i.e., IP and TEID of GTP). The user plane signaling of the user is transferred from these user plane GTP channels subsequently.

After analysis, the inventor regards that: if a signaling monitoring system can acquire 5-10% of control signalings in a centralized manner, flow association analysis between multiple interfaces can be performed, so as to acquire user registration information and user channel information of the whole network. Moreover, by using the control signalings, 90-95% of user service signalings may be reasonably distributed and associated. Thus, multi-interface signalings of the user may be distributed to the same protocol analysis module in a centralized manner, and protocol analysis and user flow association analysis between multiple interfaces are performed on the protocol analysis module in detail, so required multi-interface multi-link association analysis may be achieved. This technical solution is suitable for an application scenario of whole-network multi-interface association analysis.

The ratio of the control signalings to the total traffic is smaller than 5-10%, where key control signalings are even fewer. For example, the ratio may be smaller than 5%. Therefore, the centralized key control signaling traffic is small, and the ratio of the centralized key control signaling traffic to the total traffic is 5%. If a module for processing the key control signalings can process a 100G signaling, the whole system can process a total traffic signaling of 100G÷5%=2000G, equivalently.

By means of the abovementioned analysis, the inventor summarizes and proposes a signaling monitoring solution so as to adapt to a large-traffic scenario.

Figure 4:
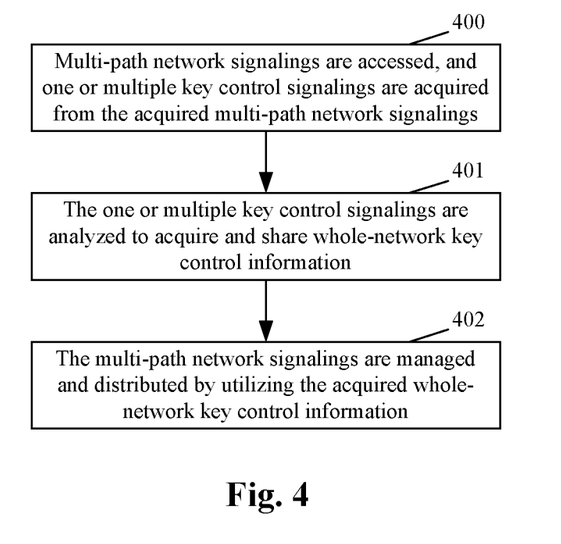
FIG. 4 is a flowchart of a signaling monitoring method according to an embodiment of the present disclosure.

FIG. 4 is a flowchart of a signaling monitoring method according to an embodiment of the present disclosure. As shown in FIG. 4, the method includes the acts 400 to 402 as follows.

At act 400, multi-path network signalings are accessed, and one or multiple key control signalings are acquired from the acquired multi-path network signalings.

In the present act, network signaling may be accessed via two or more access points; and alternatively, network signalings may also be accessed via two or more access points.

The act of acquiring the one or multiple key control signalings from the acquired multi-path network signalings may include the following acts. The network signalings containing the pre-set matching information are determined as control plane signalings according to pre-set matching information such as an IP address, and/or a port, and/or a protocol type, and then key control information is acquired from the determined control plane signalings.

It may be appreciated that the technical solution provided in the embodiment of the present disclosure is not limited to be applied for a certain signaling network. For example, the technical solution may be applied to different networks, for example, a CDMA network and an LTE network. The technical solution may be applied at different interfaces, for example, an S1-MME interface, an S11 interface and an S6a interface. Different collection demands can be met by using the technical solution. A person skilled in the art should understand that contents of the one or multiple key control signalings in the act 400 may be differently defined according to different practical implementation. In the embodiment of the present disclosure, the one or multiple key control signalings are not limited. Control information capable of meeting the collection demands, performing interface flow and protocol parsing, performing multi-interface whole-network association and performing other special processing (e.g., decryption of an encrypted code stream) may serve as key control information, and a signaling including these types of information serves as a key control signaling.

In the act 400, the multiple access points may be two or more access points, where one of the two or more access points is a main control access point, and the other access point or points in the two or more access points is/are common access point or points. The common access point or points may access multi-path network signalings, acquire one or multiple key control signalings from the acquired multi-path network signalings, and send the acquired one or multiple key control signalings to the main control access point. Alternatively, the main control access point and the common access point or points may access multi-path network signalings respectively and acquire one or multiple key control signalings from the acquired multi-path network signalings. The common access point or points further sends the acquired one or multiple key control signalings to the main control access point.

There may be two or more main control access points. In this case, the method may further include the following act. The two or more main control access points interact with each other about respective whole-network control information to form whole-network control information.

When there is one access point, the one access point is a main control access point, which accesses multi-path network signalings and acquires one or multiple key control signalings from the acquired multi-path network signalings.

At act 401, the one or multiple key control signalings are analyzed to acquire and share whole-network key control information.

The act of acquiring whole-network key control information may include the following acts. The one or multiple key control signalings are parsed, and key information of various protocols is acquired. Whole-network multi-interface flow association is performed on the key information of various protocols according to an interface flow and a user operation flow, so as to acquire complete whole-network key control information which is embodied as a whole-network control table.

Specific implementation for parsing the one or multiple key control signalings may refer to the widely-known technology of a person skilled in the art, and is not used for defining the scope of protection of the present disclosure, which will not be elaborated herein.

The whole-network control table may be formed by the whole-network key control information acquired by parsing the one or multiple key control signalings of the whole network, such as key control information of a user at each interface, association information between multiple interfaces, user control signaling channel information of each interface, user plane signaling channel information of each interface, user distribution information, and some pieces of special requirement information such as a decryption password. The control plane signaling and user plane signaling of each interface may be identified, controlled and distributed by utilizing the whole-network control table to perform association, decryption and other processing.

Analysis for the one or multiple key control signalings may be completed in a centralized manner by the main control access point regardless of how many access points are involved. If there are two or more main control access points, after each main control access point analyzes one or multiple key control signalings (which may be pre-set) managed by the main control access point to acquire key control information, each main control access point may interact with other main control access point or points about the key control information, such that the key control information in all of the two or more main control access points is updated to whole-network key control information.

The act of sharing whole-network key control information may include the following acts. The main control access point synchronizes key control information to the access points of the whole network. Thus, each access point has the same whole-network control table. How to synchronize key control information may refer to customary technical means of a person skilled in the art, and is not used for defining the scope of protection of the present disclosure, which will not be elaborated herein.

At act 402, the multi-path network signalings are managed and distributed by utilizing the acquired whole-network key control information.

Each access point has the same whole-network control table consisting of the whole-network key control information. User plane signalings and control plane signalings are distributed per a user to each data analysis center according to the whole-network control table, thus ensuring the control plane and user plane signalings related to the user to be distributed to the same data analysis center. Compared with a signaling monitoring system, in the embodiment of the present disclosure, a large amount of signalings are simultaneously accessed at multiple points, thus realizing association analysis of multi-point access signalings at multiple interfaces, solving the problems of a single-point performance bottleneck existed in a previous system and an impossibility of association of multi-point access, and providing, for whole-network large-traffic collection and association analysis, a technical solution suitable for an application scenario of whole-network multi-interface association analysis.

Further, different users are distributed to multiple data analysis centers according to traffics and user equilibriums, thus achieving concurrent distributed processing of the multiple data analysis centers and load sharing.

The method of the embodiment of the present disclosure may further include the following acts. After receiving network signaling, the data analysis center parses each protocol in the network signaling. The data analysis center centralizes multi-interface signaling data of the user, and performs interface flow analysis and multi-interface association analysis on the whole network by utilizing multi-interface signaling data acquired by parsing to finally generate a protocol analysis data record according to the collection demand. The protocol analysis data record is sent to an external data sharing system. How to parse each protocol in the network signalings and how to perform interface flow analysis and multi-interface association analysis on the whole network may refer to the widely-known technology of a person skilled in the art, and is not used for defining the scope of protection of the present disclosure, which will not be elaborated herein.

Figure 5:
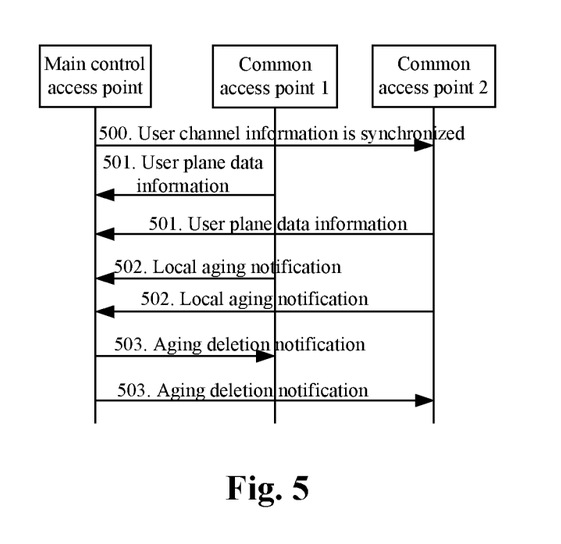
FIG. 5 is a flowchart of a method for realizing access distribution coordination in a signaling monitoring method according to an embodiment of the present disclosure.

In a multi-point access signaling monitoring process, the method of the embodiment of the present disclosure may further include the following act. A collaborative operation is executed between access points to realize statistical collection, control table aging and the like. FIG. 5 is a flowchart of a method for realizing access distribution coordination in a signaling monitoring method according to an embodiment of the present disclosure. As shown in FIG. 5, in the present embodiment, it is assumed that there is one main control access point and two common access points namely a common access point 1 and a common access point 2. The method includes the acts 500 to 503 as follows.

At act 500, the main control access point synchronizes control table information to each common access point.

At act 501, when receiving user plane data, the common access points feed user plane data information back to the main control access point.

If a certain user and channel do not have a data packet within a certain time, it represents that the user and channel are aged locally, and the common access point will send local aging notifications to the main control access point. In the present embodiment, for example, at act 502, it is assumed that the common access point 1 and the common access point 2 send local aging notifications to the main control access point respectively.

At act 503, after the main control access point collects aging notification information of each access point, if a user or channel is aged at each common access point, the main control access point is suggested to delete the user or channel information and to send an aging deletion notification to each common access point, so as to realize control table aging and global consistency.

Further, in a running process of a multi-point access signaling monitoring system, if a common access point is restarted due to failure, a recovery operation is suggested to be executed to recover the processing capability of the access point. When a common access point is restarted due to failure, control table information is lost, and a new access data packet cannot be distributed. To address this problem, the method of the embodiment of the present disclosure may further include the following acts.

A registration notification is actively sent to the main control access point after the common access point is started. When the main control access point judges that the access point is restarted, control table information is synchronized to the common access point. After synchronization of the information of the whole-network control table is completed, the common access point is recovered to a normal state, and a data packet continuous to be distributed according to the whole-network control table.

Figure 6:
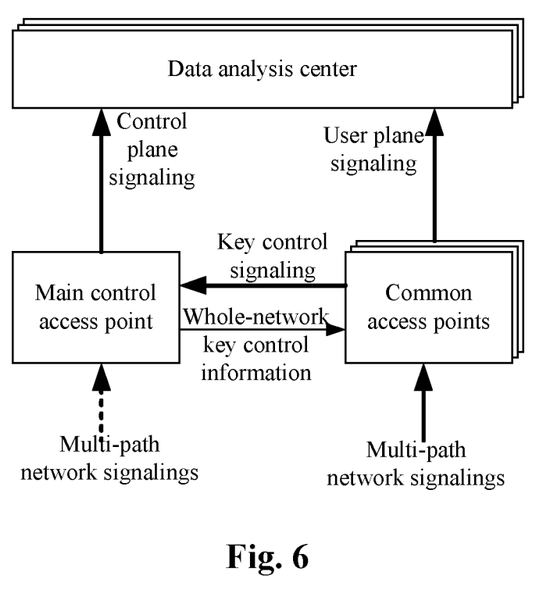
FIG. 6 is a composition structure diagram of a signaling monitoring system according to an embodiment of the present disclosure.

FIG. 6 is a composition structure diagram of a signaling monitoring system according to an embodiment of the present disclosure. As shown in FIG. 6, the signaling monitoring system includes at least one main control access point, one or multiple common access points, and one or multiple data analysis centers.

The one or multiple common access points are arranged to access multi-path network signalings, acquire one or multiple key control signalings from the acquired multi-path network signalings, output the acquired one or multiple key control signalings to the at least one main control access point, receive and store whole-network key control information from the at least one main control access point, and distribute user plane signalings to the one or multiple data analysis centers according to the whole-network key control information.

The at least one main control access point is arranged to analyze the one or multiple key control signalings from each common access point to acquire whole-network key control information, share the whole-network key control information to each common access point, and distribute control plane signalings to the one or multiple data analysis centers according to the whole-network key control information.

The one or multiple data analysis centers are arranged to receive the user plane signalings from the one or multiple common access points and the control plane signalings from the at least one main control access point, perform protocol analysis on each interface of a network to realize multi-interface association, and generate a protocol analysis data record.

In the embodiment of the present disclosure, the data analysis centers perform distributed concurrent processing. The multi-path signalings of a user flow of a user may be distributed to the same data analysis center for processing, so when multi-interface signaling association analysis is performed on the user, it is unnecessary to perform complicated processing such as interaction query with other data analysis centers. That is to say, interaction and query are not needed between the data analysis centers, the logic is simplified, and high-efficient distributed processing is achieved.

In the system of the embodiment of the present disclosure, the at least one main control access point may be further arranged to: access multi-path network signalings and acquire one or multiple key control signalings from the acquired multi-path network signalings.

Specifically, when there is one access point in the present system, the access point is a main control access point, and is arranged to access multi-path network signalings, acquire one or multiple key control signalings from the acquired multi-path network signalings, analyze the acquired one or multiple key control signalings to acquire the whole-network key control information, and distribute control plane signalings and user plane signalings to the one or multiple data analysis centers according to the whole-network key control information.

The main control access point and the one or more common access points may be further arranged to distribute different users to multiple data analysis centers according to traffics and user equilibriums.

The one or multiple data analysis centers of the embodiment of the present disclosure may be further arranged to: parse each protocol in the network signalings to acquire multi-interface signaling data, and perform interface flow analysis and multi-interface association analysis on the whole network to generate a protocol analysis data record.

When a user or channel is aged locally, the local common access point may be further arranged to send a local aging notification to the at least one main control access point. Correspondingly, the at least one main control access point may be further arranged to collect aging notification information of each common access point, delete the user or channel information, and send an aging deletion notification to each common access point.

When a common access point is restarted due to failure, the common access point restarted due to failure may be further arranged to: send a registration notification to the at least one main control access point after being started. Correspondingly, the at least one main control access point may be further arranged to judge that the access point is restarted, and synchronize whole-network control information to the common access point.

Each access point has the same whole-network control table consisting of the whole-network key control information, and user plane signalings and control plane signalings are distributed per a user to each data analysis center according to the whole-network control table, thus ensuring the control plane and user plane signalings related to the user to be distributed to the same data analysis center. Compared with a signaling monitoring system, in the embodiments of the present disclosure, a large amount of signalings are simultaneously accessed at multiple points, thus realizing association analysis of multi-point access signalings at multiple interfaces, solving the problems of a single-point performance bottleneck existed in a previous system and an impossibility of association of multi-point access, and providing, for whole-network large-traffic collection and association analysis, a technical solution suitable for an application scenario of whole-network multi-interface association analysis.

The technical solution of the present disclosure is described in detail hereinbelow in conjunction with specific embodiments.

Figure 7:
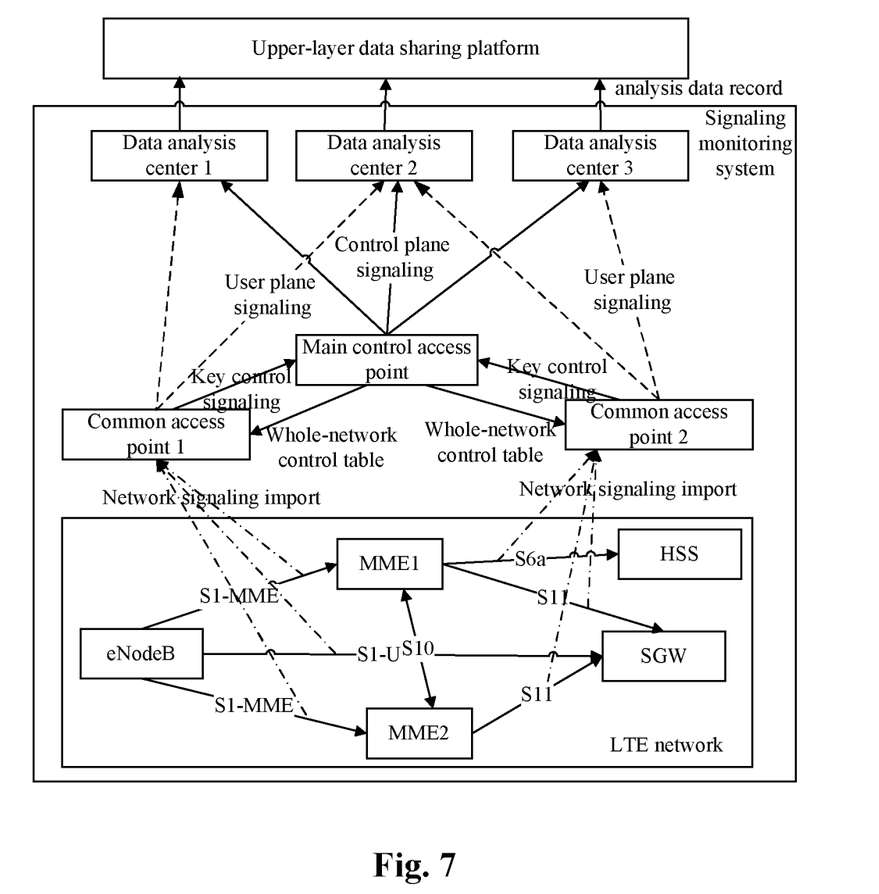
FIG. 7 is a composition structure diagram of a signaling monitoring system according to a first embodiment of the present disclosure.

FIG. 7 is a composition structure diagram of a signaling monitoring system according to a first embodiment of the present disclosure. When a network scale needing to be monitored by the signaling monitoring system is large, the traffic of the key control signalings may be increased accordingly. At this time, a main control access point centralizes resources to process the key control signalings, and is not responsible for importing network signalings. In the first embodiment, by taking a scenario where the main control access point does not import the network signalings as an example, as shown in FIG. 7, if there are two MMEs in an LTE network, the two MMEs are required to be monitored simultaneously during signaling monitoring, thus resulting in increase of control plane signalings. In the first embodiment, the main control access point is not responsible for importing network signalings, and only processes key control signalings.

A common access point 1 and a common access point 2 access network signalings, namely import network signalings, acquire one or multiple key control signalings from the acquired multi-path network signalings, and send the one or multiple key control signalings to the main control access point.

The main control access point may be only responsible for a main control function of, i.e., acquiring the one or multiple key control signalings from all the common access point or points, analyzing to generate a whole-network control table and synchronizing the whole-network control table to each common access point. In the first embodiment, in the LTE network as shown in FIG. 7, the main control access point does not access network signalings, and is only responsible for processing the one or multiple key control signalings from the common access point 1 and the common access point 2, performing analysis and interface association to generate a whole-network control table, and synchronizing the generated whole-network control table to the common access point 1 and the common access point 2.

In the first embodiment, the main control access point is only responsible for a main control function, and is completely used for processing the one or multiple key control signalings in a centralized manner, thus supporting large-traffic key control signalings, and enabling the system to support large-traffic network signaling access.

Figure 8:
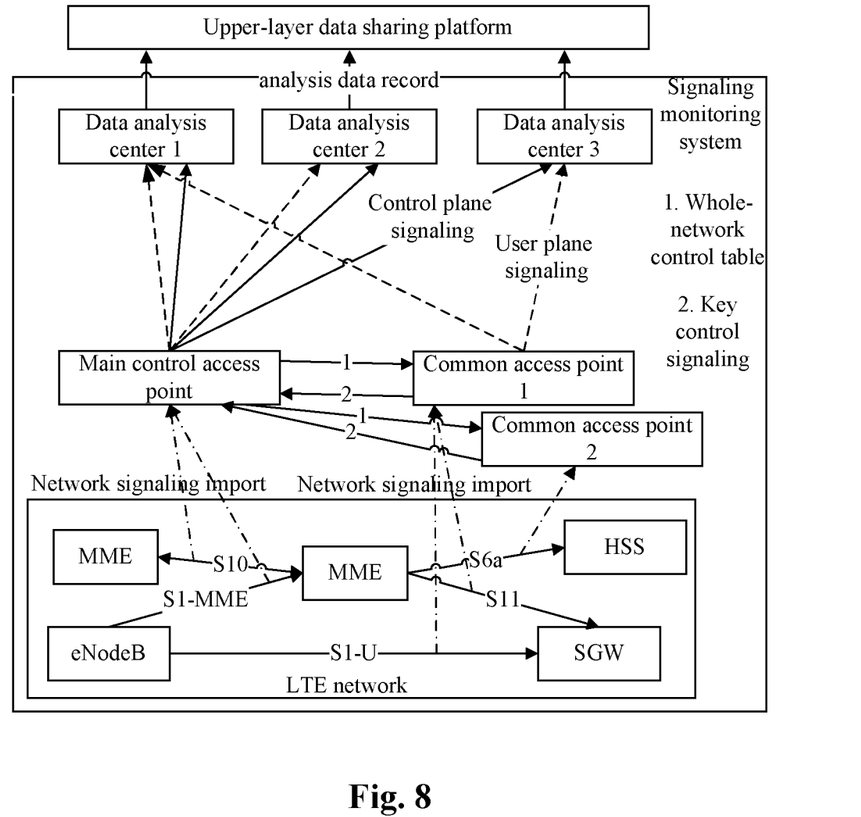
FIG. 8 is a composition structure diagram of a signaling monitoring system according to a second embodiment of the present disclosure.

FIG. 8 is a composition structure diagram of a signaling monitoring system according to a second embodiment of the present disclosure. As shown in FIG. 8, in the second embodiment, a main control node, a common access point 1 and a common access point 2 participate in access of network signalings. The common access point 1 and the common access point 2 access network signalings, namely import network signalings, acquire one or multiple key control signalings from the acquired multi-path network signalings, and send the one or multiple key control signalings to the main control access point. The main control access point performs analysis and interface association on key control signalings acquired by the main control access point itself and key control signalings received from the common access point 1 and the common access point 2 to generate a whole-network control table, and synchronizes the generated whole-network control table to the common access point 1 and the common access point 2, as shown in FIG. 8.

The common access point 1 accesses S11 interface and S1-U interface network signalings, and may acquire GTPV2-C control plane signalings and GTP-U user plane signalings in the network signalings by using rules such as an IP address, a port and a protocol type. For example, it may be assumed that a matching rule is that: a UDP packet of which source and destination addresses are MME and SGW addresses and a port is 2123 is an S11 interface GTPV2-C control plane signaling; while a UDP packet of which source and destination addresses are eNodeB and SGW addresses and a port is 2152 is an S1-U interface GTP-U user plane signaling. The common access point 1 acquires one or multiple key control signalings in the S11 interface GTPV2-C control plane signalings and sends the one or multiple key control signalings to the main control access point, while the user plane signalings are not sent to the main control access point.

In the second embodiment, the main control access point may also be functional as an access distribution module to access the network signalings to be distributed. The processing fully utilizes access interface resources of the access point. For example, the main control access point may access network signalings of an S10 interface and an S1-MME interface for processing.

The main control access point receives all key control signalings in a network, namely centralizes multiple interface signalings of a user together. The main control access point acquires protocol key information of each access point by decoding and logically processing key control signalings of various protocols. Moreover, multi-interface protocols are associated to be analyzed according to an interface flow and a user operation flow to acquire a complete whole-network control table.

Figure 11:
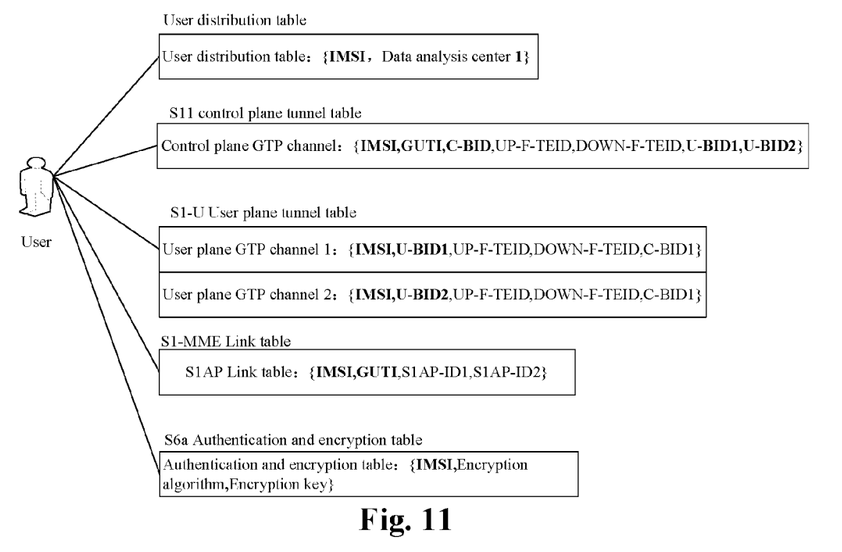
FIG. 11 is a diagram of a whole-network control table in a second embodiment of the present disclosure.

An LTE network in FIG. 8 is taken as an example. The main control access point receives key control signalings of an S1-MME interface, an S11 interface, an S6a interface, an S10 interface and an S1-U interface in the LTE network, parses key information of various protocols in the signalings, and then associates these interface protocols according to a user attachment flow in accordance with an IMSI and a GTP channel mark to form a complete user attachment registration control table, namely the whole-network control table, referring to FIG. 11. FIG. 11 is a diagram of a whole-network control table in a second embodiment of the present disclosure. As shown in FIG. 11, the whole-network control table includes an S11 control plane channel table, an S1-U user plane channel table, an S1-MME link table, an S6a authentication and encryption table and a user distribution table. These tables are associated and organized through a user IMSI, including user registration information, distribution information, user channel information, encryption information and the like. The S11 control plane and user plane channel tables are acquired by analyzing an S11 interface signaling, and the user plane channel table may acquire user plane data pertaining to a certain user in an S1-U interface. An S1AP link table is acquired by analyzing an S1-MME interface signaling. The S6a authentication and encryption table is acquired by associating signalings of multiple interfaces such as S10, S11, S1-MME and S6a, and is used for decrypting an S1-MME interface encryption signaling. The user distribution table is used for uniformly distributing the network signalings according to users, and multi-interface signalings of the users are distributed to the same data analysis center. The main control access point centralizes analysis of multi-interface key control signalings, performs multi-interface flow association, acquires the whole-network control table, and decrypts the S1-MME interface.

The main control access point synchronizes the whole-network control table to each common access point to realize information sharing.

Each access point has the same whole-network control table. User plane signalings and control plane signalings are distributed per a user to each data analysis center according to the whole-network control table, thus ensuring the control plane and user plane signalings related to the user to be distributed to the same data analysis center. Different users are distributed to multiple data analysis centers according to traffics and user equilibriums, thus achieving concurrent distributed processing of the multiple data analysis centers and load sharing.

Referring to FIG. 11, after receiving the whole-network control table, the common access point 1 and the common access point 2 identify S11 interface control signalings of the user IMSI by using tunnel keywords UP-F-TEID and DOWN-F-TEID in an S11 control plane tunnel table, and then distribute the signalings to a data analysis center 1 according to the distribution table. The common access point 1 and the common access point 2 may identify S1-MME interface signalings of the user IMSI by using S1AP link tunnel keywords S1AP-ID1 and S1AP-ID2 in an S1-MME tunnel table, decrypt the S1-MME interface signalings of the user into a clear text signaling by using an encryption algorithm and a key in the S6a authentication and encryption table, and then distribute the signalings to the data analysis center 1 according to the distribution table.

The data analysis center receives network signalings, decodes and parses each protocol in the network signalings in detail, and acquires a detailed field. The data analysis center centralizes multi-interface signaling data of the user, realizes detailed analysis for whole-network information and association analysis for multiple protocols and multiple interfaces, and completes analysis for special requirements of a collection demand. After these acts, a user analysis data record and an indicator are formed and distributed to an external data sharing platform system. As shown in FIG. 8, the data analysis center 1 collects multi-interface signalings of the user IMSI at the S1-MME interface, the S11 interface, the S1-U interface, the S6a interface and the S10 interface, decrypts each interface protocol in detail, performs interface flow analysis and multi-interface association analysis, and finally generates a protocol analysis data record required by the collection demand. A data analysis center 2 performs protocol analysis for other users concurrently, and generates a protocol analysis data record.

Figure 9:
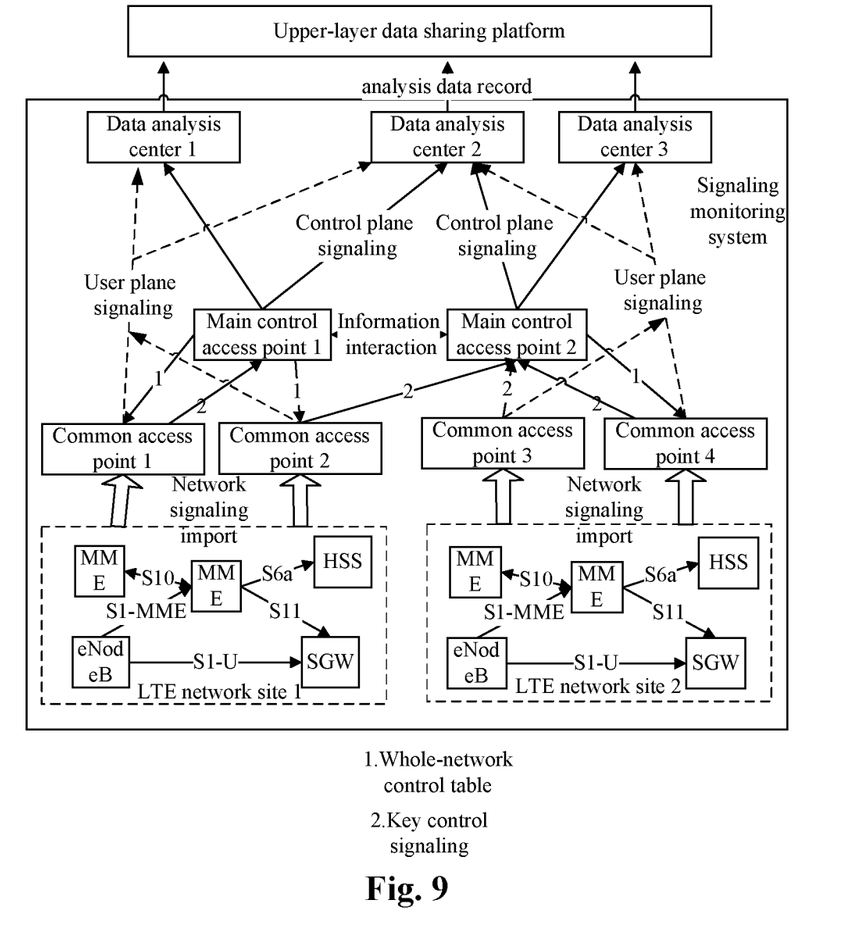
FIG. 9 is a composition structure diagram of a signaling monitoring system according to a third embodiment of the present disclosure.

FIG. 9 is a composition structure diagram of a signaling monitoring system according to a third embodiment of the present disclosure. When a network scale needing to be monitored by a signaling monitoring system is very large and the traffic of the key control signalings is also very large, one main control access point may not be able to process all key control signalings. In this case, multiple main control access points may be used to share processing of the key control signalings. Different main control access points perform information interaction through interfaces. As shown in FIG. 9, it is assumed that an operator requires the signaling monitoring system to monitor LTE networks at two nodes simultaneously, a common access point 1 and a common access point 2 access signalings of an LTE network node 1, and a common access point 3 and a common access point 4 access signalings of an LTE network node 2.

Each common access point accesses network signalings, and sends one or multiple key control signalings to multiple main control access points according to a pre-set policy.

In the present embodiment, it is assumed that each main control access point is only responsible for a main control function of centralizing the one or multiple key control signalings, analyzing the one or multiple key control signalings, generating a whole-network control table and synchronizing the whole-network control table to each common access point.

Information interaction is performed between all the main control access points through interaction interfaces to realize information remedy. For example, as shown in FIG. 9, the common access point 1 and the common access point 2 mainly distribute signalings of an LTE network node 1 to a main control access point 1 for processing, and the common access point 3 and the common access point 4 mainly distribute signalings of an LTE network node 2 to a main control access point 2 for processing. If a mobile user is switched (e.g., switched from the node 1 to the node 2) or information is insufficient, the main control access point 2 may query the main control access point 1 for user information to acquire a whole-network control table of the mobile user at another node, thus realizing information sharing.

In the third embodiment, multiple main control access points are introduced, thus improving the processing capability of key control signalings. However, interaction information and interaction logics between the main control access points are increased. For example, due to networking characteristics, some networks may be dependently divided into multiple networks, or network protocol features may support separate processing of the key control signalings, so multiple main control access points may be set, some key control signalings are processed respectively, and information interaction is performed through an interaction channel.

Figure 10:
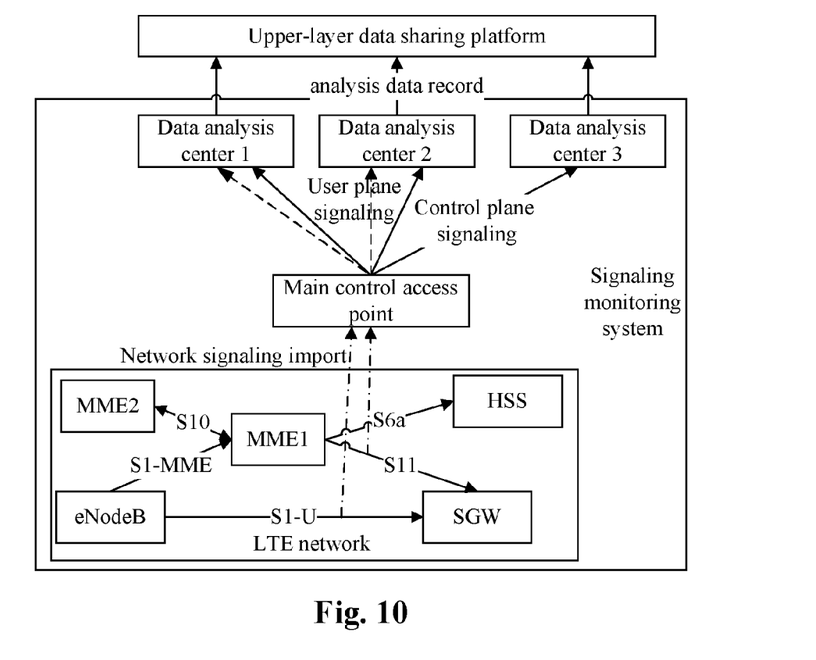
FIG. 10 is a composition structure diagram of a signaling monitoring system according to a fourth embodiment of the present disclosure.

FIG. 10 is a composition structure diagram of a signaling monitoring system according to a fourth embodiment of the present disclosure. A multi-point access signaling monitoring system in the present disclosure may be simplified to a signaling monitoring system in a single-point mode. As shown in FIG. 10, the signaling monitoring system in a single-point mode is compatible with a traditional signaling monitoring system, suitable for performing signaling monitoring on a small-scale network. The architecture implementation method has the advantages of simplicity and low cost, and meets monitoring demands of the small-scale network. The signaling monitoring system shown in the present embodiment may directly replace the traditional signaling monitoring system in the present network, or may be continuously and smoothly updated to the multi-point access signaling monitoring system in the present disclosure.

In an LTE network as shown in FIG. 10, if the LTE network is a small-scale network and an operator only requires to collect and analyze signalings of an S11 interface and an S10 interface, a network scale needing to be monitored is not large apparently, and an access point may satisfy access of the signalings of the S11 interface and the S10 interface. In this case, the signaling monitoring system in the fourth embodiment only needs a main control access point instead of a common access point, the main control access point being responsible for executing operations such as access of network signalings of the S11 interface and the S10 interface, centralized analysis of key signalings, generation of a whole-network control table and distribution of the network signalings.

The above is only the preferable embodiments of the present disclosure, and not intended to limit the scope of protection of the present disclosure. Any modifications, equivalent replacements, improvements and the like made within the principle of the present disclosure shall fall within the scope of protection defined by the appended claims of the present disclosure.

INDUSTRIAL APPLICABILITY

By means of the abovementioned embodiments and the preferable implementation modes, a large amount of signalings are simultaneously accessed at multiple points, thus realizing association analysis of multi-point access signalings at multiple interfaces, solving the problems of a single-point performance bottleneck existed in a previous system and an impossibility of association of multi-point access. The technical solution provided by the embodiments of the present disclosure is suitable for an application scenario of whole-network multi-interface association analysis.

What is claimed is:

1. A signaling monitoring method, comprising: accessing multi-path network signalings by one or multiple access points, and acquiring one or multiple key control signalings from the acquired multi-path network signalings, wherein the multiple access points are two or more access points, where one of the two or more access points is a main control access point, and the other access point or points in the two or more access points is/are common access point or points;
   analyzing the one or multiple key control signalings to acquire and share whole-network key control information; and
   managing and distributing the multi-path network signalings by utilizing the acquired whole-network key control information;
   wherein accessing the multi-path network signalings and acquiring the one or multiple key control signalings from the acquired multi-path network signalings comprises: accessing, by the common access point or points, the multi-path network signalings, acquiring, by the common access point or points, the one or multiple key control signalings from the acquired multi-path network signalings, and sending, by the common access point or points, the acquired one or multiple key control signalings to the main control access point;
   analyzing the one or multiple key control signalings to acquire and share the whole-network key control information comprises: analyzing, by the main control access point, the one or multiple key control signalings from all the common access point or points to acquire the whole-network key control information and to share the whole-network key control information to all the common access point or points; and managing and distributing the multi-path network signalings by utilizing the acquired whole-network key control information comprises: managing and distributing, by the common access point or points, the multi-path network signalings by utilizing the acquired whole-network key control information;

or, accessing the multi-path network signalings and acquiring the one or multiple key control signalings from the acquired multi-path network signalings comprises: accessing, by the main control access point and the common access point or points, multi-path network signalings respectively, and acquiring, by the main control access point and the common access point or points, one or multiple key control signalings from the acquired multi-path network signalings, sending, by the common access point or points, the acquired one or multiple key control signalings to the main control access point; analyzing the one or multiple key control signalings to acquire and share the whole-network key control information comprises: analyzing, by the main control access point, the one or multiple key control signalings from all the common access point or points and the one or multiple key control information acquired by the main control access point itself to acquire the whole-network key control information and to share the whole-network key control information to all the common access point or points; and managing and distributing the multi-path network signalings by utilizing the acquired whole-network key control information comprises: managing and distributing, by the main control access point and the common access point or points, the multi-path network signalings by utilizing the acquired whole-network key control information.

2. The signaling monitoring method as claimed in claim 1, wherein the one access point is a main control access point.

3. The signaling monitoring method as claimed in claim 2, wherein the main control access point and the common access point or points distribute different users to multiple data analysis centers according to traffics and user equilibriums.

4. The signaling monitoring method as claimed in claim 3, wherein after receiving network signaling, the multiple data analysis centers parses each protocol in the network signalings to acquire multi-interface signaling data, and performs interface flow analysis and multi-interface association analysis on a whole network to generate a protocol analysis data record.

5. The signaling monitoring method as claimed in claim 1, wherein acquiring the one or multiple key control signalings from the acquired multi-path network signalings comprises:
determining, according to pre-set matching information, network signalings containing the pre-set matching information as control plane signalings, and then acquiring key control information from the determined control plane signalings.

6. The signaling monitoring method as claimed in claim 1, wherein acquiring the whole-network key control information comprises:
parsing the one or multiple key control signalings, and acquiring key information of various protocols; and
performing whole-network multi-interface flow association on the key information of various protocols according to an interface flow and a user operation flow, so as to acquire complete whole-network key control information which is embodied as a whole-network control table.

7. The signaling monitoring method as claimed in claim 1, wherein sharing the whole-network key control information comprises: synchronizing, by the main control access point, key control information to the common access point or points of a whole network.

8. The signaling monitoring method as claimed in claim 1, wherein there are two or more main control access points, and after each main control access point analyzes one or multiple key control signalings managed by the main control access point to acquire key control information, the method further comprises:
interacting, by each main control access point, with other main control access point or points about the key control information, such that the key control information in all of the two or more main control access points is updated to whole-network key control information.

9. The signaling monitoring method as claimed in claim 1, wherein when a user or channel is aged locally, the method further comprises:
sending, by a local common access point, a local aging notification to the main control access point; and
after the main control access point collects aging notification information of each common access point, deleting the user or channel information, and sending an aging deletion notification to each common access point.

10. The signaling monitoring method as claimed in claim 1, wherein when a common access point is restarted due to failure, the method further comprises:
after the common access point is started, sending a registration notification to the main control access point; and
when the main control access point judges that the access point is restarted, synchronizing whole-network control information to the common access point.

11. The signaling monitoring method as claimed in claim 1, wherein the main control access point and the common access point or points distribute different users to multiple data analysis centers according to traffics and user equilibriums.

12. The signaling monitoring method as claimed in claim 11, wherein after receiving network signaling, the multiple data analysis centers parses each protocol in the network signalings to acquire multi-interface signaling data, and performs interface flow analysis and multi-interface association analysis on a whole network to generate a protocol analysis data record.

13. A signaling monitoring system, comprising at least one main control access point, one or multiple common access points, and one or multiple data analysis centers, wherein
the one or multiple common access points are arranged to access multi-path network signalings, acquire one or multiple key control signalings from the acquired multi-path network signalings, output the acquired one or multiple key control signalings to the at least one main control access point, receive and store whole-network key control information from the at least one main control access point, and distribute user plane signalings to the one or multiple data analysis centers according to the whole-network key control information;

the at least one main control access point is arranged to analyze the one or multiple key control signalings from each common access point to acquire the whole-network key control information, share the whole-network key control information to each common access point, and distribute control plane signalings to the one or multiple data analysis centers according to the whole-network key control information; and the one or multiple data analysis centers are arranged to receive the user plane signalings from the one or multiple common access points and the control plane signalings from the at least one main control access point, perform protocol analysis on each interface of a network to realize multi-interface association, and generate a protocol analysis data record.

14. The signaling monitoring system as claimed in claim 13, wherein the at least one main control access point is further arranged to: access multi-path network signalings and acquire one or multiple key control signalings from the acquired multi-path network signalings;

there are two or more main control access points, and after each main control access point analyzes one or multiple key control signalings managed by the main control access point to acquire key control information, each main control access point is further arranged to:

interact with other main control access point or points about the key control information, such that the key control information in all of the two or more main control access points is updated to whole-network key control information.

15. The signaling monitoring system as claimed in claim 13, wherein the main control access point and the one or multiple common access points are further arranged to distribute different users to multiple data analysis centers according to traffics and user equilibriums.

16. The signaling monitoring system as claimed in claim 15, wherein the one or multiple data analysis centers are further arranged to: parse each protocol in the network signalings to acquire multi-interface signaling data, and perform interface flow analysis and multi-interface association analysis on a whole network to generate a protocol analysis data record.

17. The signaling monitoring system as claimed in claim 13, wherein when a user or channel is aged locally, the local common access point is further arranged to send a local aging notification to the at least one main control access point; and the at least one main control access point is further arranged to collect aging notification information of each common access point, delete the user or channel information, and send an aging deletion notification to each common access point.

18. The signaling monitoring system as claimed in claim 13, wherein when a common access point is restarted due to failure, the common access point restarted due to failure is further arranged to: send a registration notification to the at least one main control access point after being started; and the at least one main control access point is further arranged to judge that the access point is restarted, and synchronize whole-network control information to the common access point.

19. A signaling monitoring system, comprising at least one main control access point, one or multiple common access points, and one or multiple data analysis centers, wherein the one or multiple common access points are arranged to access first multi-path network signalings, acquire first one or multiple key control signalings from the first multi-path network signalings, send the first one or multiple key control signalings to the at least one main control access point, receive and store whole-network key control information from the at least one main control access point, and distribute first user plane signalings to the one or multiple data analysis centers according to the whole-network key control information;

the at least one main control access point is arranged to access second multi-path network signalings, acquire second one or multiple key control signalings from the second acquired multi-path network signalings, receive the first one or multiple key control signalings from the one or multiple common access points, analyze the first one or multiple key control signalings and the second one or multiple key control signalings acquired by the at least one main control access point itself to acquire the whole-network key control information, share the whole-network key control information to the one or multiple common access points, and distribute control plane signalings and second user plane signalings to the one or multiple data analysis centers according to the whole-network key control information; and the one or multiple data analysis centers are arranged to receive the first user plane signalings from the one or multiple common access points, and the second user plane signalings and the control plane signalings from the at least one main control access point, perform protocol analysis on each interface of a network to realize multi-interface association, and generate a protocol analysis data record.

* * * * *

UNITED STATES PATENT AND TRADEMARK OFFICE
CERTIFICATE OF CORRECTION

PATENT NO. : 10,411,987 B2
APPLICATION NO. : 15/529387
DATED : September 10, 2019
INVENTOR(S) : Zhisen Gao et al.

Page 1 of 1

It is certified that error appears in the above-identified patent and that said Letters Patent is hereby corrected as shown below:

On the Title Page

Item (71) Applicant:
Please replace [[ZTE CORPORATION, Shenzhen, (CN)]] with -- XI'AN ZHONGXING NEW SOFTWARE CO., LTD., Xi'an (CN) --

Item (73) Assignee:
Please replace [[ZTE CORPORATION, Shenzhen, (CN)]] with -- XI'AN ZHONGXING NEW SOFTWARE CO., LTD., Xi'an (CN) --

Signed and Sealed this
Twenty-fifth Day of February, 2020

Andrei Iancu
*Director of the United States Patent and Trademark Office*